United States Patent [19]

Belson

[11] 4,254,459
[45] Mar. 3, 1981

[54] DIRECT CURRENT TO DIRECT CURRENT CONVERTER

[75] Inventor: James M. Belson, Oklahoma City, Okla.

[73] Assignee: JMJ Electronics Corp., Oklahoma City, Okla.

[21] Appl. No.: 1,673

[22] Filed: Jan. 8, 1979

[51] Int. Cl.³ .......................................... H02M 3/335
[52] U.S. Cl. ...................................... 363/24; 363/134
[58] Field of Search .............. 331/113 A; 363/24, 25, 363/133, 134

[56] References Cited

U.S. PATENT DOCUMENTS

| | | | |
|---|---|---|---|
| 3,305,761 | 2/1967 | Heinrich et al. | 363/133 |
| 3,351,840 | 11/1967 | Yearly | 363/24 |
| 3,467,852 | 9/1969 | Murray et al. | 331/113 A |
| 3,490,027 | 1/1970 | Galetto et al. | 363/24 |
| 3,629,725 | 12/1971 | Sun Chun | 331/113 A |
| 3,670,234 | 6/1972 | Joyce | 363/134 X |

Primary Examiner—William M. Shoop
Attorney, Agent, or Firm—Dunlap, Codding & McCarthy

[57] ABSTRACT

A direct current-to-direct current converter is disclosed wherein a saturable core oscillator provides square-wave alternating current signals to the bases of two transistors of a class B push-pull amplifier such that the two transistors are alternately biased into conducting states. Each transistor controls the current in one section of a center-tapped primary winding of a transformer such that the alternation of conduction between transistors produces an alternating flux density in the core of the transformer and direct current is provided by rectifying and filtering the alternating current induced thereby in the secondary winding of the transformer.

6 Claims, 1 Drawing Figure

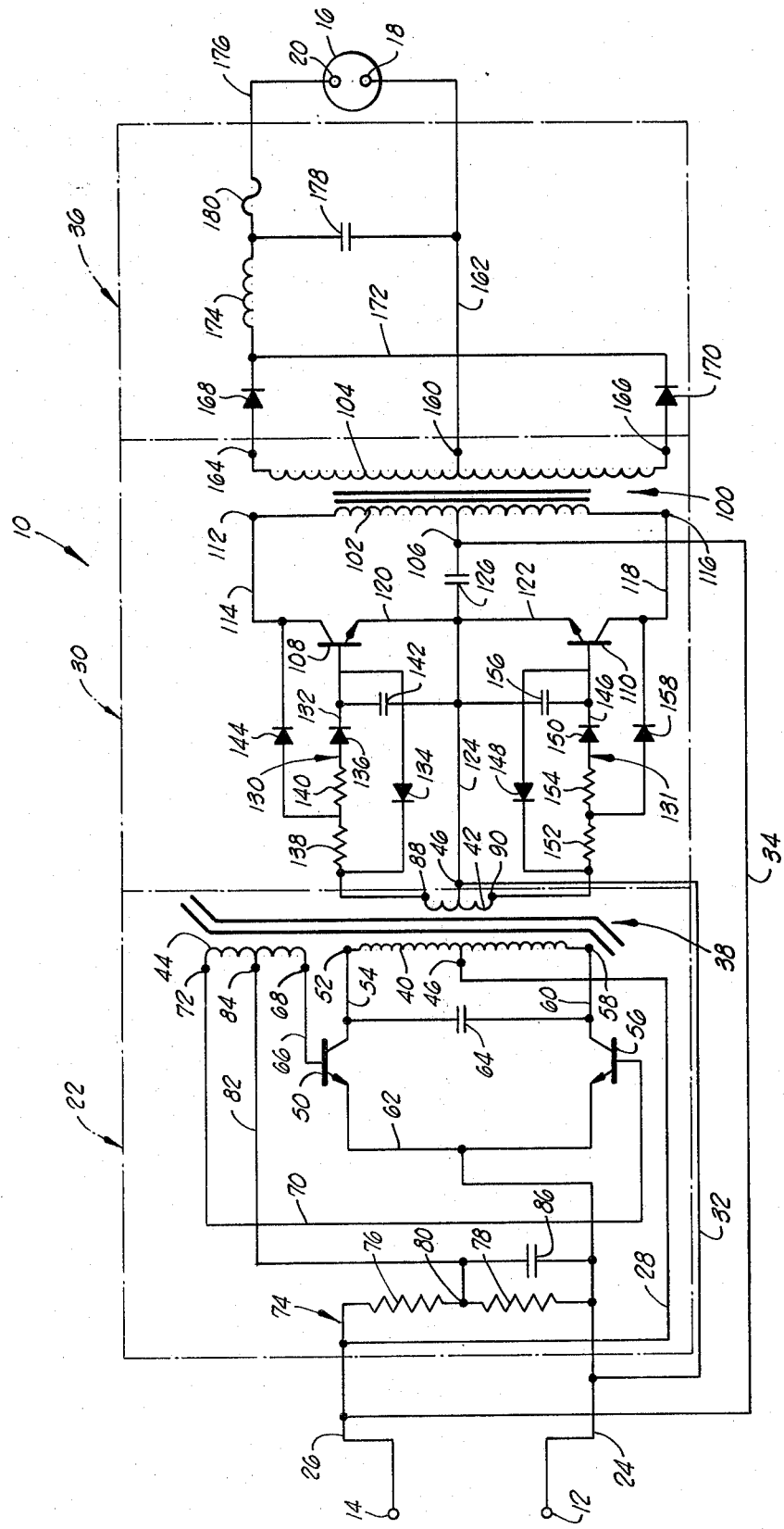

DIRECT CURRENT TO DIRECT CURRENT CONVERTER

BACKGROUND OF THE INVENTION

1. Field of the Invention

The present invention relates generally to electrical converters and, more particularly, but not by way of limitation, to converters suitable for applications having relatively large power requirements.

2. Discussion of the Prior Art

It is known that many power tools and the like, designed for operation from alternating current electrical power, can be operated on direct current supplied, for example, by an automobile alternator operating so as to produce a higher voltage than is normally the case when the alternator is used for usual automotive purposes. Devices are currently on the market which exploit this knowledge by utilizing automobile alternators as the generating means in electrical power generating systems which may, or may not, be mounted on an automobile to utilize the alternator therein. Examples include U.S. Pat. No. 3,845,321, issued Oct. 29, 1974 to Santilli and U.S. Pat. No. 4,074,145, issued Feb. 14, 1978 to Laffoon et al. Such devices have the advantages of ease of transportation to provide electrical power substantially anywhere and the ready availability of repair parts so that a sizable market has grown up in recent years for such devices.

A problem is encountered with regard to a part of this market. In Europe, electrical power supplied by utilities is commonly supplied at 220 volts rather than at the lower voltage common in the United States so that tools designed for European market cannot, in general, be operated from automobile alternator-based power supplies which are currently available. Moreover, a solution to this problem has not been forthcoming via redesigned alternator-based power systems. Two problems militate against such a solution: automobile alternators are designed to produce a considerably lower voltage than the 220 volts required and do not stand up well when used at 220 volts; and a solution along this line would leave unsolved the problem of providing portable electric power capable of being used to operate some tools which operate at 110 volts and others which operate at 220 volts. Accordingly, a need exists for a direct current-to-direct current converter which can be provided as optional equipment to be used with an automobile alternator power system. Moreover, in order that the advantages of the alternator-based system be retained, it is important that the converter be compact, that it be relatively maintenance free, and that it be capable of handling large amounts of electrical power commensurate with the use thereof to operate power tools.

Various types of converters are known to provide relatively high voltage direct current from a relatively low voltage direct current source. One type uses a saturable-core square-wave oscillator such as has been described at Section 182 of "Basic Theory and Application of Transistors" first published by Dover Publications, Inc., New York, New York, in 1963 as a reprint of Technical Manual No. 11-690 published in 1959 by the Department of the Army. An oscillator of this type is particularly desirable for use in a converter designed for the above purpose because the square-wave output of the saturable transformer utilized to achieve oscillation requires that only minimal filtering be utilized after rectification to provide low ripple direct current and, moreover, such oscillators have no moving parts. Thus, it might appear that a converter suitable for use with an alternator-based power generation system could be provided by rectifying and filtering the output of a saturable-core oscillator as has been done in low power applications. In practice, however, such has not proven to be the case. It has been found that a converter cannot be economically constructed in this manner to provide the power output levels required to solve the above problem. The cores of the saturable transformers used in saturable-core oscillators are generally expensive with the cost becoming excessive as larger cores are used. In general, an oscillator core available at a cost commensurate with the above application cannot be used to construct a converter capable of reaching the voltage levels required.

SUMMARY OF THE INVENTION

The present invention solves the problem of providing at reasonable cost a compact direct current-to-direct current converter capable of delivering power levels suitable for operation of power tools requiring a 220 volt supply and having no moving parts, giving rise to mechanical wear, by interposing a class B, push-pull power amplifier, generally of the type described at Section 131 of the above-referenced publication, between a saturable-core oscillator and a rectifier filter circuit. The amplifier transformer core is constructed of less expensive material than is required for the oscillator transformer core and the oscillator core is made small to provide the converter with both the compactness and low cost required for a converter to be used as optional equipment with an automobile alternator-based electric power generating system. The oscillator is coupled to the amplifier via integrator circuits which retard the switching of transistors in the amplifier into a conducting state when the electromotive force supplied by the oscillator to the transistors makes a transition from a state reverse biasing the transistors to a state forward biasing the transistors.

An object of the invention is to provide a compact direct current-to-direct current converter capable of supplying 220 volt direct current from an automobile alternator based electric power generating system.

Another object of the invention is to provide a relatively low cost direct current-to-direct current converter capable of delivering large amounts of electrical power.

Other objects, features and advantages of the present invention will become apparent from the following detailed description of the preferred embodiment when read in conjunction with the accompanying drawing and the appended claims.

BRIEF DESCRIPTION OF THE DRAWINGS

The drawing is a circuit diagram of the preferred embodiment of the direct current-to-direct current converter of the present invention.

DESCRIPTION OF THE PREFERRED EMBODIMENT

Referring now to the drawing, shown therein and designated by the general reference numeral 10 is a direct current-to-direct current converter constructed in accordance with the present invention. The converter 10 is provided with a first input terminal 12 and a second input terminal 14 of any suitable type so as to permit connection of a direct current source to the converter 10. An output receptacle 16 having first and second output terminals, 18 and 20 respectively is provided such that an external load can be connected to the converter 10 to receive direct current power therefrom.

The converter 10 generally comprises: an oscillator 22, connected to the first and second input terminals 12 and 14 via a conductor 24, connected to the first input terminal 12, and conductors 26 and 28, connected to the second input terminal 14; a class B, push-pull power amplifier 30 connected to the input terminals 12 and 14 via a conductor 32 connected to the first input terminal 12 via the conductor 24, and a conductor 34, connected to the second input terminal 14 via the conductor 26; and a rectifier and filter circuit 36. The amplifier 30 is inductively coupled to the oscillator 22 and the rectifier filter circuit 36 is inductively coupled to the amplifier 30 as will be described more fully herein below.

Turning to the oscillator 22, the oscillator 22 comprises a saturable transformer 38 having a center-tapped primary winding 40, a center-tapped secondary winding 42, and a center-tapped feedback winding 44. The core of the transformer 38 is constructed of a material exhibiting a high squareness ratio for a purpose which will be discussed below. A suitable core for the transformer 38 is a tape wound core available from Magnetics, Inc. of Butler, Pennsylvania, sold under the trademark "Square Orthonol". Such cores are formed by spirally winding a thin tape, constructed of an alloy containing 50% nickel and 50% iron into a ring so that the core of the transformer 38 has the general form of a torus generated by a rectangle. Such cores generally have a squareness ratio of at least 0.94 and the tape wound construction of such cores provide for low power losses in such cores.

The primary, secondary and feedback windings, 40, 42 and 44 respectively, are bifilarly wrapped on the core of the transformer 38 so that, as will be discussed more fully below, the oscillator 22 will generate symmetric, phase opposed square wave signals in the sections of the secondary winding 42 thereof disposed to either side of the center tap 46 thereof. That is, each of the windings 40, 42 and 44 is formed by wrapping a two-conductor length of cable about the core of the transformer 38 and connecting one conductor, at one end of the cable, to the other conductor, at the opposite end of the cable, to form the center tap of the winding. Each conductor of each cable then provides one section of the winding and the unconnected ends of the conductors form first and second ends of each winding.

The center tap 46 of the primary winding 40 of the transformer 38 is connected via the conductors 28 and 26 to the second input terminal 14 of the converter 10. The oscillator 22 further comprises a first oscillator switching transistor 50, the collector of which is connected to a first end 52 of the primary winding 40 via a conductor 54, and a second oscillator switching transistor 56, the collector of which is connected to a second end 58 of the primary winding 40 opposite the first end 52 thereof, via a conductor 60. The emitters of the first and second oscillator switching transistors, 50 and 56 respectively, are connected via a conductor 62 which is connected, via the conductor 24 to the first input terminal 12. By way of example, the first and second oscillator switching transistors, 50 and 56 respectively, can be NPN transistors and, where such is the case, the first input terminal 12 of the converter 10 will be connected to the negative pole of the source of direct current power for the converter 10. It will be recognized by those skilled in the art that the first and second oscillator switching transistors, 50 and 56 respectively, can be PNP transistors and, in such case, the first input terminal 12 would be the positive terminal of the source of direct current power for the converter 10.

As will be described more fully below, electrical oscillations occur in the primary winding 40, and high voltage spikes capable of damaging the transistors 50, 56 may be induced in the primary winding 40. A capacitor 64 is connected between the collectors of the transistors 50, 56 to provide a short circuit for such voltage spikes.

The base of the first oscillator switching transistor 50 is connected via a conductor 66 to a second end 68 of the feedback winding 44 and, similarly, the base of the second oscillator switching transistor 56 is connected, via a conductor 70 to a first end 72 of the feedback winding 44, opposite the second end 68 thereof. As used herein, with regard to the primary and feedback windings, 40 and 44 respectively, the terminology first and second ends specifies the phase relations between currents in the primary winding 40 and an induced electromotive force in the secondary winding 44. In particular, the selection of ends of the primary and feedback windings, 40 and 44 respectively, is such that a conventional current through the feedback winding 44 from the second end 68 thereof to the first end 72 thereof will produce in the core of the transformer 38 a magnetic field intensity in the same direction as that which will be produced by a conventional current in the primary winding 40 from the second end 58 thereof to the first end 52 thereof. The purpose of connecting the second end 68 of the feedback winding 44 to the base of the first switching transistor 50 and of connecting the first end 72 of the feedback winding 44 to the base of the second oscillator switching transistor 56 will be discussed below.

The oscillator 22 further comprises a voltage divider 74 connected to the conductors 24 and 26 such that the voltage divider 74 is connected across the input terminals 12 and 14 of the converter 10. Specifically, the voltage divider 74 comprises a first resistor 76 in series with a second resistor 78 such that a small voltage difference exists between the first input terminal 12 and the center 80 of the voltage divider 74 defined by the connection of the first resistor 76 to the second resistor 78. The center 80 of the voltage divider is connected via a conductor 82 to the center tap 84 of the feedback winding 44 to provide a small forward bias to each of the first and second oscillator switching transistors 50 and 56 respectively. A capacitor 86 is connected in parallel with the second resistor 78 such that the voltage divider 74 presents substantially no resistance to an alternating current induced in the feedback winding 44 of the transformer 38. That is, an alternating electromotive force induced in the section of the feedback winding 44 between the center tap 84 thereof and the second end 68 thereof will be applied substantially undiminished to the base of the first oscillator switching transistor 50 and an alternating electromotive force induced in the section of the feedback winding between the center tap 84 thereof and the first end 72 thereof will be applied, substantially undiminished, to the base of the second oscillator switching transistor 56.

It would be well at this point to consider the operation of the oscillator 22 prior to describing the amplifier 30 and the rectifier-filter circuit 36. Initially, it will be noted that each of the oscillator switching transistors 50, 56 provides a current path between the input terminals 12, 14 of the converter 10 and that each such current path includes one-half (½) of the primary winding 40 of the transformer 38. For example, the current path including the first oscillator switching transistor 50 comprises the conductors 26 and 28, the section of the primary winding 40 between the center tap 46 and the first end 52 thereof, the conductor 54, the first oscillator switching transistor 50, the conductor 62 and the conductor 24. Since each of these conductive paths is connected to the second input terminal 14 via sections of the primary winding 40 on opposite sides of the center tap 46 thereof, a current through one oscillator switching transistor 50, 56 will apply a magnetic field intensity to the core of a transformer 38 tending to magnetize the core in one direction while a current through the other oscillator switching transistor 50, 56 will apply a magnetic field intensity to the core of the transformer 38 tending to magnetize the core in the opposite direction. Moreover, the bases of both oscillator switching transistors 50, 56 are connected via the feedback winding 44, to the center 80 of the voltage divider 72 so that, when a potential difference is applied across the input terminals 12, 14 of the converter 10, both oscillator switching transistors 50, 56 will be biased to conduct a current.

In general, the currents through the oscillator switching transistors 50, 56 will be unequal when the potential difference is applied to the input terminals 12, 14 because of slight differences in the characteristics of the transistors 50, 56, such differences being of manufacturing or thermal origin. Thus, the current through one of the transistors 50, 56 will apply a slightly larger magnetic field intensity to the core of the transformer 38 than will the other transistor 50, 56. Accordingly, the core of the transistor 38 will undergo a change in the state of magnetization thereof so that the magnetic flux density in the core of the transformer 38 will change. In accordance with Faraday's Law, this change in magnetic induction will induce in each section of the feedback winding 44, to either side of the center tap 84 thereof, electromotive forces to increase the forward biasing of one oscillator switching transistor 50, 56 and to decrease the forward biasing of the other oscillator switching transistor 50, 56. Because of the symmetry of winding the two sections of the feedback winding 44, such electromotive forces will be substantially equal, but of opposite sense. The connection of the second end 68 of the feedback winding 44 to the base of the first oscillator switching transistor 50 and the connection of the first end 72 of the feedback winding 44 to the base of the second oscillator switching transistor 56, as the terms "first" and "second" when applied to the ends of the feedback winding 44 are defined as specified above, results in an increase in the forward biasing of the oscillator switching transistor 50, 56 initially conducting the larger current and a reduction in the forward bias of the oscillator switching transistor 50, 56 initially conducting the smaller current. That is, the initial imbalance in the conduction of the oscillator switching transistors 50, 56 results in regenerative feedback to increase such imbalance via the magnetization of the core of the transformer 38. The result is that the oscillator switching transistor 50, 56 initially conducting the larger current is biased into a saturated state to present substantially no impedance to the current conducted thereby while the other oscillator switching transistor 50, 56 is driven to cut-off to become nonconducting. Under such conditions, the rate of magnetization of the core of the transformer 38 and, accordingly, the rate of change of the flux density in the core are determined by the magnetic properties of the material of which the core of the transformer 38 is constructed. Where, as is the case with the transformer 38 of the converter 10 of the present invention, the core of the transformer 38 is constructed of a material having a high squareness ratio, the flux density of the core increases substantially linearly with an applied magnetic field intensity in a non-saturated state of the core, the rate of change of the flux density of the core will be substantially constant during such time that the magnetization of the core of transformer 38 is in an unsaturated state.

The magnetization of the core of the transformer 38 continues to increase substantially linearly until saturation of the core occurs. With saturation of the core of the transformer 38, such linear increase of magnetization thereof can no longer occur. Since the electromotive force induced in the feedback winding arises primarily from magnetization of the core of the transformer 38, such electromotive force decreases at a rate depending upon the form of the hysteresis loop of the material of which the core of the transformer 38 is constructed. Where, as in the present case, the core of the transformer 38 is constructed of a material having a high squareness ratio, the rate of change of flux density in the core undergoes a change from a high rate, corresponding to magnetization of the core, to a very low rate, corresponding to saturation of the core, at a time which is short compared to the time required for saturation of the core to occur. Accordingly, the electromotive force induced in the feedback winding 44 and the secondary winding 42 undergoes a transition substantially to zero in a time short compared to the time wherein such electromotive force had a large, substantially constant value corresponding to magnetization of the core of the transformer 38.

With the rapid decrease in the electromotive force induced in the feedback winding 44 and sustaining the large current conducted by one of the oscillator switching transistors 50, 56, the current in such oscillator switching transistor 50, 56 drops in a correspondingly short time to result in a correspondingly rapid decrease in the magnetic field intensity applied to the core of the transformer 38. Thus, demagnetization of the core of the transformer 38 commences. Such demagnetization induces an electromotive force in the feedback winding 44 with a sense opposite that induced during magnetization of the core of the transformer 38 such that the oscillator switching transistor 50, 56 initially driven to cut-off conducts a larger current that the oscillator switching transistor 50, 56 initially driven to saturation. That is, the roles of the oscillator switching transistors 50, 56 are reversed so that magnetization of the core of the transformer 38 occurs in a direction opposite the direction of initial magnetization to induce in the feedback winding 44 and secondary winding 42 a substantially constant electromotive force with a sense opposite the initial sense thereof. As in the case of initial magnetization of the core of the transformer 38, such magnetization continues to saturation of the core where the rolls of the oscillator switching transistors 50, 56 are again reversed as described above. Thus, with the application of the potential difference to the input terminals 12, 14, of the converter 10, the core of the transformer 38 alternately magnetizes in opposite directions to induce a square-wave electromotive force in the secondary winding 42 of the oscillator 22. In particular, the electromotive force induced in the secondary winding 42 produces, with respect to the center tap 46 thereof, two square-wave signals at opposite first and second ends, 88 and 90 respectively, of the secondary winding 42 which are in phase opposition. That is: the voltage at each end 88, 90 of the secondary winding 42 of the transformer 38 alternates between two values of equal magnitude but different sign with respect to the center tap 46; at such times that the voltage at the first end 88 of the secondary winding 42 is positive with respect to the center tap 46 thereof, the voltage at the second end 90 is negative with respect to the center tap 46; and at such times that the voltage at the first end 88 is negative with respect to the center tap 46, the voltage at the second end 90 is positive with respect to the center tap 46.

Referring now to the amplifier 30, the amplifier 30 comprises an amplifier transformer 100 having a center-tapped amplifier primary winding 102 and a center-tapped amplifier secondary winding 104. As in the case of the windings 40, 42, 44 of the oscillator transformer 38, the windings 102 and 104 are bifilarly wrapped on the core of the amplifier transformer 100. The core of the amplifier transformer 100 is, as in the case of the oscillator transformer 38, of tape wound construction to reduce power losses in the core of the amplifier transformer 100. However, in contrast to the situation obtaining with the oscillator 22, it is preferable that saturation of the core of the amplifier transformer 100 not occur for a reason to be discussed below. Thus, to insure against saturation, the core of the amplifier transformer is constructed of a material having a higher saturation flux density and lower squareness ratio than the material from which the core of the oscillator transformer 38 is constructed. It has been found that a suitable alloy for the amplifier transformer 100 is approximately 3.5% silicon and 96.5% iron. Tape wound cores having such a composition are available from Magnetics, Inc. of Butler, Pennsylvania, under the trade name "Magnasil".

The center tap 106 of the amplifier primary winding 102 is connected to the second input terminal 14 of the converter 10 and the amplifier 30 further comprises a first amplifier switching transistor 108 and a second amplifier switching transistor 110 connected to the amplifier primary winding 102 in the usual push-pull circuit configuration. That is; the collector of the first amplifier switching transistor 108 is connected to the first end 112 of the amplifier primary winding 102 via a conductor 114; the collector of the second amplifier switching transistor 110 is connected to a second end 116 of the amplifier primary winding 102, opposite the first end 112 thereof, via a conductor 118; and the emitters of the amplifier switching transistors 108, 110 are connected to the first input terminal 12 of the converter 10 via conductors 120, 122 and 124 and the conductor 32. By way of example, the amplifier switching transistors 108, 110 have been shown as NPN transistors in the drawings and, consistently with the previous illustration of the oscillator switching transistors 50, 52 as NPN transistors such that the second input terminal 14 of the converter 10 is connected to the positive pole of a source of direct current power to the converter 10, the emitters of the amplifier switching transistors 108, 110 have been connected to the first, or negative, input terminal of the converter 10. It will be clear to those skilled in the art that the amplifier switching transistors 108, 110 can be PNP transistors and, in such case, the emitters of the amplifier transistors 108, 110 would be connected to the positive pole of the direct current source for the converter 10. A capacitor 126 is connected between the center tap 106 of the amplifier primary winding 102 and the emitters of the amplifier switching transistors 108, 110 to prevent coupling of the oscillator 22 and the amplifier 30 via the connection of both the oscillator 22 and the amplifier 30 to the converter input terminals 12, 14.

The center tap 46 of the secondary winding 42 of the oscillator transformer 38 is connected to the emitters of the amplifier switching transistors 108, 110 via the conductors 124, 120 and 122 and the amplifier 30 further includes a first shaping circuit 130, connecting the first end 88 of the secondary winding 42 of the oscillator transformer 38 to the base of the first amplifier switching transistor 108, and a second shaping circuit 131, identical to the first shaping circuit 130 and connecting the second end 90 of the secondary winding 42 of the oscillator transformer 38 to the base of the second amplifier switching transistor 110. That is, phase opposed square wave signals are applied to the shaping circuits 130, 131 to apply identical but phase opposed signals to the bases of the amplifier transistors 108, 110.

The first shaping circuit 130 comprises a first shaping circuit forward current branch 132 in parallel with a diode 134, both the diode 134 and the first shaping circuit forward current branch 132 being connected in series with the base emitter junction of the first amplifier switching transistor 108 between the base of the first amplifier switching transistor 108 and the first end 88 of the secondary winding 42 of the oscillator transformer 38. The first shaping circuit forward current branch 132 comprises a diode 136 connected to the base of the first amplifier switching transistor 108 to conduct thereto a current in a direction opposed to the direction of a current conducted by the diode 134 so that the first shaping circuit forward current branch 132 will conduct a current to the base of the first amplifier switching transistor 108 in a direction opposite to that conducted from the base of the first amplifier switching transistor 108 by the diode 134. In particular, the conduction directions of the diodes 136 and 134 are selected such that forward biasing currents are received by the base of the first amplifier switching transistor 108 via the first shaping circuit forward current branch 132 and forward biasing currents are removed from the base of the transistor 108 via the diode 134. Thus, where the first amplifier switching transistor is an NPN transistor, as has been indicated by way of example in the drawing, the cathode of the diode 136 and the anode of the diode 134 are connected to the base of the transistor 108.

The first shaping circuit forward current branch 132 further comprises a resistor formed of two resistive elements 138 and 140 disposed in series with the base emitter junction of the first amplifier switching transistor 108 and a capacitor 142 connected in parallel with the base emitter junction of the first amplifier switching transistor 108 such that the resistor formed by the elements 138 and 140 and the capacitor 142 connected in parallel with the base emitter junction of the first amplifier switching transistor 108 form an integrator circuit for forward biasing currents transmitted from the first end 88 of the secondary winding 42 of the oscillator transformer 38 to the base of the first amplifier switching transistor 108. A diode 144 is connected between the junction of the resistive elements 138 and 140 and the collector of the first amplifier switching transistor 108. The conduction direction of the diode 144 is selected to conduct, with respect to the first end 88 of the secondary winding 42 of the oscillator transformer 38, a current in the same direction as the conduction direction of the diode 136 of the first shaping circuit forward current branch 132.

The second shaping circuit 131 is identical to the first shaping circuit 130. That is, the second shaping circuit 131 comprises a second shaping circuit forward current branch 146 to transmit, from the second end 90 of the secondary winding 42 of the oscillator transformer 38, a forward biasing current to the base of the second amplifier switching transistor 110 and a diode 148 to remove forward biasing currents from the base of second amplifier switching transistor 110. As in the case of the first shaping circuit forward current branch 132, the second shaping circuit forward current branch 146 comprises a diode 150, a resistor having two sections 152 and 154, and a capacitor 156 to integrate forward biasing signals received by the base of the second amplifier switching transistor 110. A diode 158 is connected between the junction of the resistive elements 152 and 154 and the collector of the second amplifier switching transistor 110 in the same manner that the diode 144 is connected between the junction of the resistive elements 138 and 140 and the collector of the first amplifier switching transistor 108.

As in the case of the oscillator 22, it will be well to describe the operation of the amplifier 30 before proceeding to a discussion of the rectifier-filter circuit 36.

As previously described, the response of the oscillator 22 to the application of a direct current to the converter input terminals 12 and 14 is to provide phase opposed square wave signals at the first and second ends, 88 and 90 respectively, of the secondary winding 42 of the oscillator transformer 38. Such phase opposed signals are transmitted to the bases of the first and second amplifier switching transistors, 108 and 110 respectively via the the first and second shaping circuits 130 and 131 respectively. The number of turns of the secondary winding 42 of the oscillator transformer 38 is selected to provide forward biasing currents to the bases of the amplifier switching transistors 108, 110 sufficient to drive the amplifier switching transistors 108, 110 into a saturated conducting state. That is, it is desirable that a large current be passed by each of the amplifier switching transistors 108, 110 receive forward biasing signals in order that the flux density produced in the core of the amplifier transformer 100 be large enough that the amplifier transformer 100 will have a power output suitable for operating power tools or the like. However, it has been found that saturation of the transistors 108, 110 can exacerbate a problem which is capable of damaging the transistors 108, 110 as will now be explained. Initially, it is noted that the secondary winding 42 of the oscillator transformer 38 provides phase opposed square wave signals to the shaping circuits 130, 131 to cause the transistors to conduct alternately. Since the signals are square wave signals, the transition of each transistor 108, 110 from a non-conducting to a conducting state should the signals be applied directly to the bases of the transistors 108, 110 would be very short. However, the transition of a transistor from a conducting state to a non-conducting state is retarded by the inherent base storage time of a transistor. Thus, because of the finite base storage times of the transistors 108, 110, a transition of one of the transistors 108, 110 to a conducting state could occur before the corresponding transition of the other transistor 108, 110 to a non-conducting state when a change in sense of the electromotive force induced in the secondary winding 42 of the oscillator transformer 38 occurs. Since the currents in the transistors 108, 110 are limited by inductance provided by the amplifier transformer 100 and since the sections of the amplifier primary winding 102 to either side of the center tap 106 thereof are balanced via the bifilar winding of the primary winding 102, large currents would occur in the transistors 108, 110 should both transistors 108, 110 conduct simultaneously. These currents could destroy the transistors 108, 110. In order to prevent such destruction of the transistors 108, 110, each of the shaping circuits 130, 131 contain integrator circuits, as described above, in the forward current branches 132, 146 respectively thereof so that the rise time of a current in the on-turning transistor is delayed when a change in the sense of the electromotive force induced in the secondary winding 42 of the oscillator transformer 38 occurs. That is, conduction of each transistor 108, 110 is retarded by the necessity that the square wave signals produced by the secondary winding 42 of the oscillator transformer 38 charge the capacitors 142, 156 via the resistive elements 138, 140 and the resistive elements 152 and 154 in the forward current branches 132 and 146 respectively. The connection of the diodes 134 and 148 in parallel with the forward current branches 132, 136 respectively draw large reverse currents from the bases of transistors 108, 110 to help in turning them off and to rapidly discharge capacitors 142, 156 when the sense of the electromotive force induced in the secondary winding 42 of the oscillator transformer 38 changes so that the turn-off times of the transistor 108, 110 is limited only by the base storage times of the transistors 108, 110. It will be recognized that the problem presented by the limitation on turn-off times of the transistors 108, 110 by the base storage times thereof is exacerbated where conduction by the transistors 108 and 110 saturates during such times that the transistors 108, 110 are in conducting states. To avoid saturation of the transistors 108, 110, the diodes 144 and 158 clamp the collector voltages of the transistors 108, 110, during such periods that the transistors 108, 110 are in conducting states, to values not less than the voltages at the junctions of the resistive elements 138 and 140 and 152 and 154. Accordingly, the collector of each transistor 108, 110 will remain at a voltage greater than that at the base thereof, during such time that the transistor 108 or 110 is in a conducting state, by an amount equal to the product of the base current and the resistance of the resistive element 140 or 154 respectively. This insures that the base collector junctions of transistors 108 and 110 cannot take on a forward bias and reduces storage delay to essentially zero. Thus, in response to the square wave electromotive force induced in the secondary winding 42 of the oscillator transformer 38, each transistor 108, 110 will alternately conduct and the transistors 108, 110 will not simultaneously conduct.

Since each transistor 108, 110 passes a current through one section of the amplifier primary winding 102, between the center tap 106 thereof and one of the ends 112 and 116 thereof, the amplifier 30 responds to the alternating electromotive force in the secondary winding 42 of the oscillator transformer 38 to produce an alternating flux density in the core of the transformer 100. This alternating flux density, in turn, induces an alternating electromotive force in the secondary winding 104 of the amplifier transformer 100. It has been found that should the core of the amplifier transformer 100 saturate in response to the currents in the primary winding 102 thereof, the electromotive force induced in the secondary winding 104 thereof will exhibit voltage spikes requiring excessive filtering of a current provided by the secondary winding 104 of the amplifier transformer 100. In order to avoid the requirement of this excessive filtering, the core of the amplifier transformer 100 is constructed, as has been noted above, of a material having a larger saturation flux density and lower squareness ratio than that of the material from which the core of the oscillator transformer 38 is constructed.

The secondary winding 104 of the amplifier transformer 100 has a center tap 160 which is connected to the second output terminal 18 of the converter 10 via a conductor 162. First and second ends 164 and 166 of the secondary winding 104 are connected to anodes of diodes 168 and 170 respectively, and the cathodes of the diodes 168 and 170 are connected via a conductor 172 to provide full wave rectification of the electromotive force induced in the secondary winding 104 of the amplifier transformer 100 in the usual manner. The cathodes of the diodes 168 and 170 are connected to the first output terminal 20 of the converter 10 via an inductor 174 and a conductor 176. A capacitor 178 is connected in parallel across the output terminals 18, 20 so that the inductor 174 and the capacitor 178 form an LC filter for a current induced in the secondary winding 104 of the amplifier transformer 100 in the usual manner. A fuse 180 can be inserted in the conductor 176 to avoid excessive current drain via the output terminals 18, 20 of the converter 10 in the usual manner.

It is clear that the present invention is well adapted to carry out the objects and obtain the ends and advantages mentioned as well as those inherent therein. While a presently preferred embodiment of the invention has been described for purposes of this disclosure, numerous changes may be made which will readily suggest themselves to those skilled in the art and which are encompassed within the spirit of the invention disclosed as defined in the appended claims.

What is claimed is:

1. In a converter for providing direct current at a relatively high voltage to a load connected to first and second output terminals of the converter from direct current supplied at a relatively lower voltage from a source connected to first and second input terminals of the converter of the type including a saturable-core square-wave oscillator connected to the converter input terminals for generating an alternating, square-wave electromotive force in an oscillator secondary winding of a saturable transformer, forming a portion of the oscillator, in response to direct current supplied at the converter input terminals and having rectifier means connected between the converter output terminals and the oscillator secondary winding for providing direct current to a load connected to said output terminals in response to an alternating electromotive force supplied thereto, the improvement wherein the converter further comprises amplifier means, interposed between the oscillator secondary winding and the rectifier means and connected to the converter input terminals, for generating and supplying to the rectifier means an electromotive force having an amplitude greater than a potential difference applied to the converter input terminals in response to the alternating, square-wave electromotive force generated in the oscillator secondary winding wherein the oscillator secondary winding is center-tapped and connected via the center tap thereof to the first input terminal of the converter so as to provide two square-wave oscillator output signals in phase opposition at opposing first and second ends thereof and wherein the amplifier means is characterized as comprising a push-pull power amplifier comprising:

an amplifier transformer having a center-tapped amplifier primary winding connected via the center tap thereof to the second input terminal of the converter and an amplifier secondary winding connected to the rectifier means;

a first switching transistor connected between one end of the amplifier primary winding and the first input terminal of the converter, the collector of the first switching transistor connected to the amplifier primary winding and the emitter thereof connected to the first input terminal of the converter, and the base of the first switching transistor connected to one end of the oscillator secondary winding to receive one of the square-wave oscillator output signals, whereby the first switching transistor alternates between conducting and non-conducting states corresponding to the two states of the square-wave signal supplied to the base thereof; and a second switching transistor connected between the other end of the amplifier primary winding and the first input terminal of the converter, the collector of the first switching transistor connected to the amplifier primary winding and the emitter thereof connected to the first input terminal of the converter, and the base of the second switching transistor connected to the other end of the oscillator secondary winding to receive the other of the square-wave oscillator output signals, whereby the second switching transistor alternates between conducting and non-conducting states, corresponding to the state of the square-wave signal supplied to the base thereof, in phase opposition with the alternation between conducting and non-conducting states by the first switching transistor; and wherein the amplifier means further comprises:

a first shaping circuit interposed between the oscillator secondary winding and the base of the first switching transistor, comprising:

a first shaping circuit forward current branch, comprising:

a diode connected in series with the base-emitter junction of the first switching transistor so as to transmit a forward biasing current thereto;

a resistor connected in series with the base-emitter junction of the first switching transistor; and a capacitor connected in parallel across the base-emitter junction of the first switching transistor; and a diode connected between the base of the first switching transistor and the oscillator secondary winding so as to transmit electrical current in a direction opposite the direction wherein a current is transmitted by the diode of the first shaping circuit forward current branch; and a second shaping circuit interposed between the oscillator secondary winding and the base of the second switching transistor, comprising:

a diode connected in series with the base-emitter junction of the second switching transistor so as to transmit a forward biasing current thereto;

a resistor connected in series with the base-emitter junction of the second switching transistor; and a capacitor connected in parallel across the base-emitter junction of the second switching transistor; and a diode connected between the base of the second switching transistor and the oscillator secondary winding so as to transmit electrical current in a direction opposite the direction wherein a current is transmitted by the diode of the second shaping circuit forward current branch.

2. The converter of claim 1 wherein the resistor of the first shaping circuit forward current branch comprises two, serially connected resistive elements; wherein the resistor of the second shaping circuit forward current branch comprises two, serially connected resistive elements; and wherein the amplifier means further comprises:

a diode connected between the collector of the first switching transistor and the junction of the resistive elements of the resistor of the first shaping circuit forward current branch so as to conduct current in the same direction with respect to the oscillator secondary winding as the conduction direction of the diode of the first shaping circuit forward current branch; and a diode connected between the collector of the second switching transistor and the junction of the resistive elements of the resistor of the second shaping circuit forward current branch so as to conduct current in the same direction with respect to the oscillator secondary winding as the conduction direction of the diode of the second shaping circuit forward current branch.

3. The converter of claim 1, or 2 wherein the amplifier secondary winding is characterized as being center-tapped and wherein each of the primary winding and the secondary winding of the amplifier transformer are characterized as being bifilarly wrapped on the core thereof.

4. The converter of claim 1 wherein the core of the amplifier transformer is characterized as having a lower squareness ratio and a higher saturation flux density than the core of the saturable transformer of the oscillator.

5. In a direct current to direct current converter of the type including a saturable-core square-wave oscillator for generating an alternating, square-wave electromotive force in a center-tapped secondary winding of an oscillator transformer forming a portion of said oscillator and a push-pull power ampifier having an amplifier transformer, said amplifier transformer having a center-tapped primary winding, wherein the center taps of the oscillator transformer secondary winding and of the amplifier transformer primary winding are connected to first and second input terminals of the converter respectively so as to receive direct current supplied to the converter via a source connected to said input terminals, and wherein said power amplifier further includes first and second switching transistors, the collector of each switching transistor connected to one end of the amplifier transformer primary winding and the emitter of each switching transistor connected to the first input terminal of the converter, the improvement wherein said converter further comprises:

a first shaping circuit interposed between the oscillator secondary winding and the base of the first switching transistor, comprising:

a first shaping circuit forward current branch, comprising:

a diode connected in series with the base-emitter junction of the first switching transistor so as to transmit a forward biasing current thereto;

a resistor connected in series with the base-emitter junction of the first switching transistor; and a capacitor connector in parallel across the base-emitter junction of the first switching transistor; and a diode connected between the base of the first switching transistor and the oscillator secondary winding so as to transmit electrical current in a direction opposite the direction wherein a current is transmitted by the diode of the first shaping circuit forward current branch; and a second shaping circuit interposed between the oscillator secondary winding and the base of the second switching transistor, comprising:

a diode connected in series with the base-emitter junction of the second switching transistor so as to transmit a forward biasing current thereto;

a resistor connected in series with the base-emitter junction of the second switching transistor; and a capacitor connected in parallel across the base-emitter junction of the second switching transistor; and a diode connected between the base of the second switching transistor and the oscillator secondary winding so as to transmit electrical current in a direction opposite the direction wherein a current is transmitted by the diode of the second shaping circuit forward current branch.

6. The converter of claim 5 wherein the resistor of the first shaping circuit forward current branch comprises two, serially connected resistive elements; wherein the resistor of the second shaping circuit forward current branch comprises two, serially connected resistive elements; and wherein the converter further comprises:

a diode connected between the collector of the first switching transistor and the junction of the resistive elements of the resistor of the first shaping circuit forward current branch so as to conduct current in the same direction with respect to the oscillator secondary winding as the conduction direction of the diode of the first shaping circuit forward current branch; and a diode connected between the collector of the second switching transistor and the junction of the resistive elements of the resistor of the second shaping circuit forward current branch so as to conduct current in the same direction with respect to the oscillator secondary winding as the conduction direction of the diode of the second shaping circuit forward current branch.

* * * * *